Nov. 3, 1925.  1,559,798
C. S. SMITH
SPRING HANGER AND METHOD OF CONNECTING THE
SAME TO SIDE BARS OF AUTOMOBILE FRAMES
Filed Oct. 1, 1923
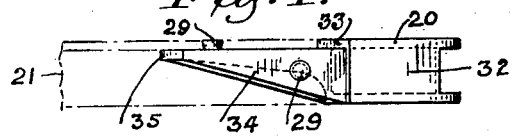
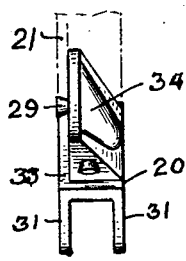
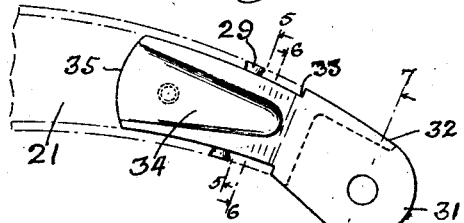
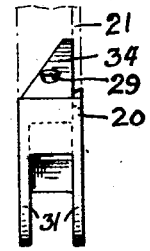
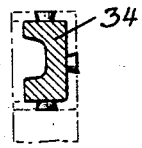
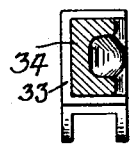
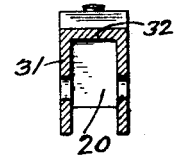
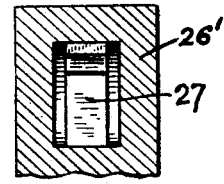
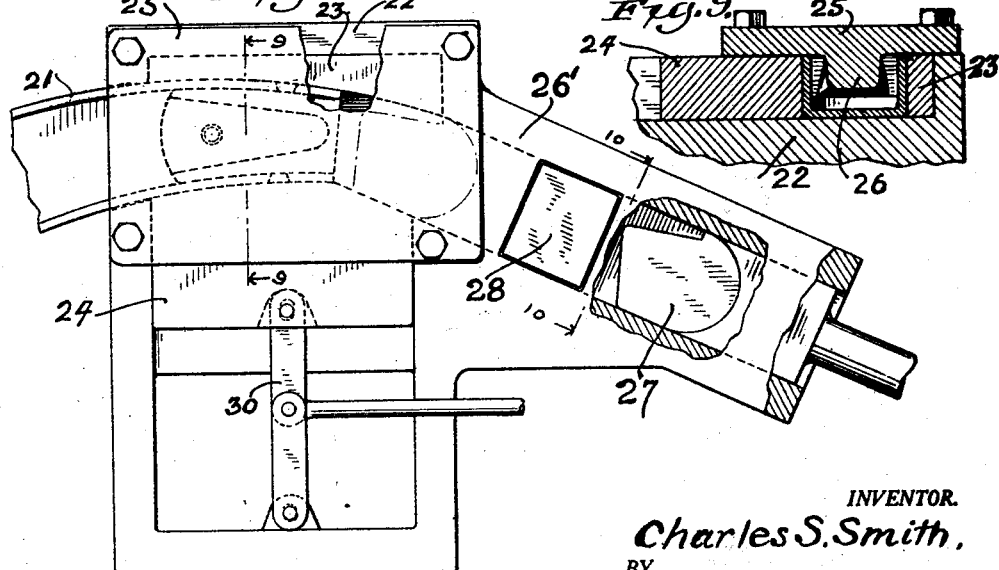
INVENTOR.
Charles S. Smith,
BY
Erwin, Wheeler & Woolard
ATTORNEYS.
WITNESS:

Patented Nov. 3, 1925.

1,559,798

UNITED STATES PATENT OFFICE.

CHARLES S. SMITH, OF MILWAUKEE, WISCONSIN, ASSIGNOR TO A. O. SMITH CORPORATION, OF MILWAUKEE, WISCONSIN, A CORPORATION OF NEW YORK.

SPRING HANGER AND METHOD OF CONNECTING THE SAME TO SIDE BARS OF AUTOMOBILE FRAMES.

Application filed October 1, 1923. Serial No. 665,996.

*To all whom it may concern:*

Be it known that I, CHARLES S. SMITH, a citizen of the United States, and a resident of the city of Milwaukee, in the county of Milwaukee and State of Wisconsin, have invented certain new and useful Improvements in Spring Hangers and Methods of Connecting the Same to Side Bars of Automobile Frames; and I do declare the following to be a clear, exact, and complete description thereof, such as will enable others skilled in the art to which the invention relates to make and use the same, reference being had to the accompanying drawing for an illustration of the manner in which my invention may be reduced to practice.

My invention relates to an improvement in the construction of spring hangers and the methods of their formation and attachment to the side bars of an automobile or other vehicle frame, so that a unitary and permanent connection is established between the parts.

Spring hangers, both forged and cast, have been shaped so as to be received in the channeled ends of the side bars of an automobile frame, and then secured in the desired fixed positions by means of rivets, the holes for which are drilled after the assembly has been made. The machining operations required in trimming the ends of the side bars and fitting the spring hangers, and in drilling and riveting, are time-consuming and increase greatly the cost of producing the automobile frame. Moreover, a good joint between the parts is not always produced, and loss of materials and labor results from indifferent workmanship.

It is the purpose of the present invention to eliminate the difficulties above mentioned as sometimes encountered in constructing automobile frames, and to produce the side bars with the spring hangers accurately fitted therein as integral parts of the structure.

In the practice of my invention the spring hanger is forged into shape at the time of its application to the side bar. The end of the channeled side bar is previously prepared by forming suitable openings or anchorages in the web and flanges thereof, and inserted in a mold, the latter being so constructed that the desired shape will be imparted to the spring hanger when pressure is applied to the heated ingot of metal out of which the hanger is formed and which is placed in the mold. The pressure exerted is sufficient to cause the heated metal to flow into and fill the mold cavities, as well as the channel at the end of the side bar and the anchoring openings provided therein, so that as the spring hanger assumes its predetermined contour, it is, in the flow of the metal, firmly attached to the side bar in such manner as to make a rigid and permanent connection between the parts and constitute a unitary structure of great durability.

The novel features of the invention will be pointed out in the appended claims.

Referring now to the drawing:

Figure 1 is a plan view showing in dotted lines one end of a side bar, and showing the spring hanger in its relation thereto.

Fig. 2 is a view in elevation from the inside of the frame showing the same parts.

Fig. 3 is a view looking from the under side of Fig. 2.

Fig. 4 is a like view from the upper side of Fig. 2.

Fig. 5 is a transverse sectional view on the line 5—5, Fig. 2, looking in the direction of the arrows.

Fig. 6 is a similar view on the line 6—6, looking in the direction of the arrows.

Fig. 7 is a transverse sectional view of the spring hanger on the line 7—7, Fig. 2, looking in the direction of the arrows.

Fig. 8 is a plan view showing the arrangement of the dies and parts of the press in which the spring hanger is forged or die pressed into shape and formed as a permanent attachment with the side bar.

Fig. 9 is a vertical sectional view on the line 9—9, Fig. 8, looking in the direction of the arrows.

Fig. 10 is a view in elevation, showing parts of the press in vertical section, on the line 10—10, Fig. 8, and showing the formation of the plunger or ram for imparting shape to the heated metal ingot out of which the spring hanger is formed.

In the drawing, the numeral 20 indicates the spring hanger, which may be produced in any form to enable it to meet the requirements of the construction of the particular vehicle frame in which it is embodied.

One of the usual pressed steel channel side bars 21 is shown in dotted lines, with the said spring hanger 20 in proper relation thereto. As before indicated, the spring hanger as heretofore separately produced is fitted into the end of the channel side bar, and secured therein by means of rivets or other extraneous fastening devices. The operation of accurately fitting the hanger into the channel is one requiring the exercise of very great care and skill, and involves an expenditure of both time and money. This operation of fitting the spring hanger is followed by drilling when the parts are assembled, after which the uniting operations are performed. When not accurately fitted through careless workmanship, the work is lost and additional expense is involved in remedying the defect.

In carrying out my invention I clamp the end of the channel side bar in a die casting press or mold comprising a bed 22 upon which are placed dies 23 and 24, having their opposite faces shaped in correspondence with the exterior of the flanges at the end of the side bar, so as to rigidly back up the said flanges. A complemental die 25 is then secured in position over the dies 23 and 24 to thus enclose the side bar. The die 25 is provided upon its lower face with a projection 26, which enters the channel in the end of the side bar, but which projection is so formed as to leave a clear space between it and the web at the bottom of the channel and inside walls at the end of the side bar. At a suitable distance from the outer end of the side bar the said projection 26 is so shaped as to completely fill the channel and act as a dam or stop beyond which the clear space before referred to does not extend. The end of the side bar which is inserted in the clamp or mold is previously provided with perforations in the web and the flanges thereof, such perforations being reamed from the outside so as to form openings which are constricted at their inner ends and flared outwardly.

In the arrangement thus described, the mold is left open only in a direction leading outwardly from the end of the side bar, the said mold being provided with an extension 26' in line with such open end, which extension serves as a guide for a plunger or ram 27, the acting face of which is shaped so as to conform to the outlines of the recessed projecting end of the spring hanger.

Spring hangers are usually formed at their projecting head ends with two vertical, parallel walls 31, 31, joined by a bridge 32, partially covering the space between the walls, and constituting a recess into which the end of the spring or its connection with the hanger may be received and supported upon a pivot set in the said walls. Rearwardly from the solid intermediate neck portion 33 to which the walls and bridge are connected, a tang 34 extends into the channel of the side bar, a shoulder 35 formed upon the upper, lower and outer sides of the spring hanger receiving the end of the web and opposite flanges of the channel side bar. The tang 34 is substantially of channel cross section for the sake of lightness, the channel formed therein deepening and widening from the neck to the rear or tail end 35, where its thickness may be greatly reduced.

An ingot 28 heated to a suitable temperature, is inserted into the interior of the said guide 26' in advance of the acting face of the ram or plunger 27. The dimensions and proportions of such ingot will first be determined by the character of the spring hanger which is to be shaped or formed therefrom. Pressure being applied to the ram or plunger 27, the highly heated ingot 28 is forced into the mold and caused by reason of its malleability to flow into and completely fill the crevices therein and the clear space at the inside of the channel side bar, thus forming the tang 34. Such pressure causes portions of the ductile metal to ooze outwardly through the perforations in the web and flanges of the side bar and to expand therein and completely fill the tapering openings, forming substantial locking projections 29 which are produced integrally with the spring hanger and which effectively unite the spring hanger to the channel bar. The pressure also imparts the desired shape to the recessed projecting end of the spring hanger, by reason of the peculiar formation of the acting face of the ram or plunger 27, by means of which the walls 31, 31, and bridge 32, are duly shaped.

The spring hanger is thus constituted and incorporated as an integral part of the side bar, and no other connecting operations are necessary. The pressure of the ram or plunger being withdrawn, the side bar with its now permanently connected spring hanger may be removed from the press or mold by withdrawing the upper die 25 and the lateral die 24. The length of movement of the latter having been determined, it may be actuated into fixed position and retracted therefrom by means of a toggle 30 or other devices. By reason of the contour of the dies, a smooth exterior surface is produced, and no finishing operations are required, and the protruding rivet heads inherent to the usual construction are eliminated.

My invention, in its combined operation, greatly simplifies the work of production and lessens its cost, and eliminates the separate manufacture of the spring hangers and the several subsequent operations involved in their attachment to the side bars. As a result of the foregoing process resorted to in carrying out my invention, a very strong and durable connection between the side bar and the spring hanger is effected.

Having thus described my invention, what I claim and desire to secure by Letters Patent of the United States, is:

1. In an automobile frame, a channel side bar, and a spring hanger secured in the channel of the side bar, the spring hanger being permanently united to the side bar by means of integral portions of the hanger engaging the side bar.

2. In an automobile frame, a channel side bar provided with perforations, and a spring hanger seated in the channel and provided with integral projecting portions which enter the said perforations and permanently unite the hanger to the side bar.

3. In an automobile frame, a channel side bar provided with perforations which flare outwardly from the sides thereof, and a spring hanger seated in the said channel, the said hanger being provided with integral projections which enter and fill the said flared perforations to permanently unite the hanger to the side bar.

4. In an automobile frame, a side bar of pressed sheet metal having a web and opposite flanges extending from the said web, the web and flanges being provided with perforations which flare outwardly with relation thereto, and a spring hanger arranged between the said flanges and bearing against the said web, the said spring hanger being provided with integral projections which enter and fill the flared perforations to permanently unite the hanger to the side bar.

5. In an automobile frame, a side bar of pressed sheet metal having a web and opposite flanges extending from the said web, the web and flanges being provided with perforations which flare outwardly with relation thereto, and a spring hanger having a tang arranged between the said flanges and bearing against the said web, the said spring hanger being provided with integral projections upon its tang which enter and fill the flared perforations to permanently unite the hanger to the side bar, and with means upon its head for effecting spring connection.

6. The method of attaching spring hangers to the side bars of automobile frames, which comprises the operations of forming a pressed sheet metal channel side bar with perforations in the web and flanges thereof, forging a spring hanger into shape in the channel of the said bar and filling the said perforations with integral portions of metal flowing from the spring hanger during the forging operation, to permanently unite the spring hanger to the side bar.

7. The method of attaching spring hangers to the side bars of automobile frames, which comprises the operations of drawing a metal sheet into the form of a channel having a web and opposed flanges, forming outwardly flaring perforations therein, forging a spring hanger into shape in the said channel and causing integral portions of the metal flowing from the spring hanger during the forging operation to enter and expand in the said perforations, to permanently unite the spring hanger to the side bar.

8. The method of forming and attaching spring hangers to the side bars of automobile frames, which comprises the operations of drawing a metal sheet into the form of a channel having a web and opposed flanges extending therefrom, forming perforations in such web and flanges, clamping the end of the channel bar in a die-casting press to maintain the said flanges against outward movement, heating an ingot and forging a spring hanger therefrom into shape in the said channel and causing portions of the metal in the transformation of the ingot to flow into and fill the said perforations to permanently unite the hanger to the side bar in the forging operation.

In testimony whereof, I have signed my name at Milwaukee, this 24th day of September, 1923.

C. S. SMITH.